INVENTORS
RAYMOND E. BLANCO
WALTER E. CLARK
WILLIAM C. YEE

Aug. 26, 1969     R. E. BLANCO ETAL     3,463,814
CHEMICAL CYCLE FOR EVAPORATIVE WATER DESALINATION PLANT

United States Patent Office 3,463,814
Patented Aug. 26, 1969

3,463,814
CHEMICAL CYCLE FOR EVAPORATIVE WATER DESALINATION PLANT
Raymond E. Blanco, Walter E. Clark, and William C. Yee, Oak Ridge, Tenn., assignors to the United States of America as represented by the Secretary of the Interior
Filed Mar. 24, 1967, Ser. No. 626,377
Int. Cl. C07c *127/00;* C02b *1/06*
U.S. Cl. 260—555      1 Claim

ABSTRACT OF THE DISCLOSURE

A process for preventing scale and obtaining by-products from the conversion of saline waters which includes: the contacting of saline water with an alkali containing sodium carbonate to precipitate out calcium carbonate, the recovery of purified water by the evaporation and condensation of a portion of the saline water, treating the calcium carbonate to form carbon dioxide, electrolyzing a portion of the concentrated brine to produce hydrogen, chlorine and caustic, and treating the caustic with a portion of the carbon dioxide to produce recycle sodium carbonate and which may further include the precipitation of magnesium of the saline water with a strong base, and the production of urea using hydrogen from electrolysis and carbon dioxide.

BACKGROUND OF THE INVENTION

Field of invention

This invention relates to a method of preventing scale formation in saline water evaporators as well as to the recovery of valuable by-products in a saline water conversion.

Description of prior art

Previous systems designed to prevent scale formation in evaporative desalination units are disclosed in U.S. Patents 3,042,606 and 3,163,599 to Salutsky et al., and 3,199,752 to Checkovich, as well as in Office of Saline Water Research and Development Progress Report No. 110, entitled "By-Products From Saline Water Conversion Plants—A Feasibility Study."

Prior methods of obtaining valuable by-products from sea water are disclosed in U.S. Patent 2,934,419 to Cook and by Tanaka et al. in "Studies on Separation of Raw Materials From Sea Water (I), Pilot-Plant Test for the Separation of Mg++ and Ca++, and the Autovapor Evaporation," Reports of the Government Chemical Industrial Research Institute, Tokyo, vol. 51, No. 12, December 1956.

Many of these systems require the continuous purchase of large amounts of chemicals, i.e., sulfuric acid, lime, soda ash, hydrochloric acid or carbon dioxide. The impracticability of continually transporting and supplying these chemicals has prevented the commercial utilization of any of these processes. Yet, the problem of scale prevention is still of major concern in evaporative desalination systems and the efficient recovery of by-products from saline waters is still an important goal in the art.

Thus, there remains a need in the art for an economical process for scale prevention in evaporative desalination systems which does not require a continuous supply of chemical feeds and there is also a need for an efficient saline water by-product recovery process.

We have now discovered that through a unique arrangement of process steps, the chemical constituents of sea water can themselves be used to prevent scale formation in evaporative desalination systems as well as to form valuable by-products.

SUMMARY

Briefly, the present invention comprises a method of removing scale formers from saline waters and simultaneously recovering valuable by-products from an evaporative desalination. The removal of scale formers is accomplished by the addition of alkali materials such as sodium carbonate and sodium hydroxide to the saline water thereby precipitating calcium carbonate and magnesium hydroxide. The concentrated brine produced by distillation is electrolyzed to produce caustic and hydrogen; the former is contacted with carbon dioxide produced by the calcination of the carbonate precipitate to produce sodium carbonate for recycle, and the latter may (1) be converted to ammonia and then contacted with carbon dioxide to make urea, or (2) may be combined with chlorine, another product of the electrolysis, to form hydrochloric acid for use in adjusting the pH of the sea water prior to evaporation or for sale.

Accordingly, it is an object of this invention to provide a process for preventing scale formation in evaporative desalinations which does not require any chemical feed other than the chemicals produced from the saline waters themselves.

Further, it is an object of this invention to provide a chemically self-sufficient cycle to remove scale formers from saline water.

Still further, it is an object of this invention to provide an integrated saline water descaling and mineral recovery process.

These and other objects and advantages of the invention will become more apparent from the following description in which reference is made to the flowsheets of the accompanying drawings.

BRIEF DESCRIPTION OF THE DRAWINGS

Accompanying FIGURES 1 through 4 contains flow diagrams which depict various embodiments of the present invention. In each case, all of the carbonate and carbon dioxide required is recovered from the virgin sea water or from recycle streams.

DETAILED DESCRIPTION OF INVENTION

Figure 1:
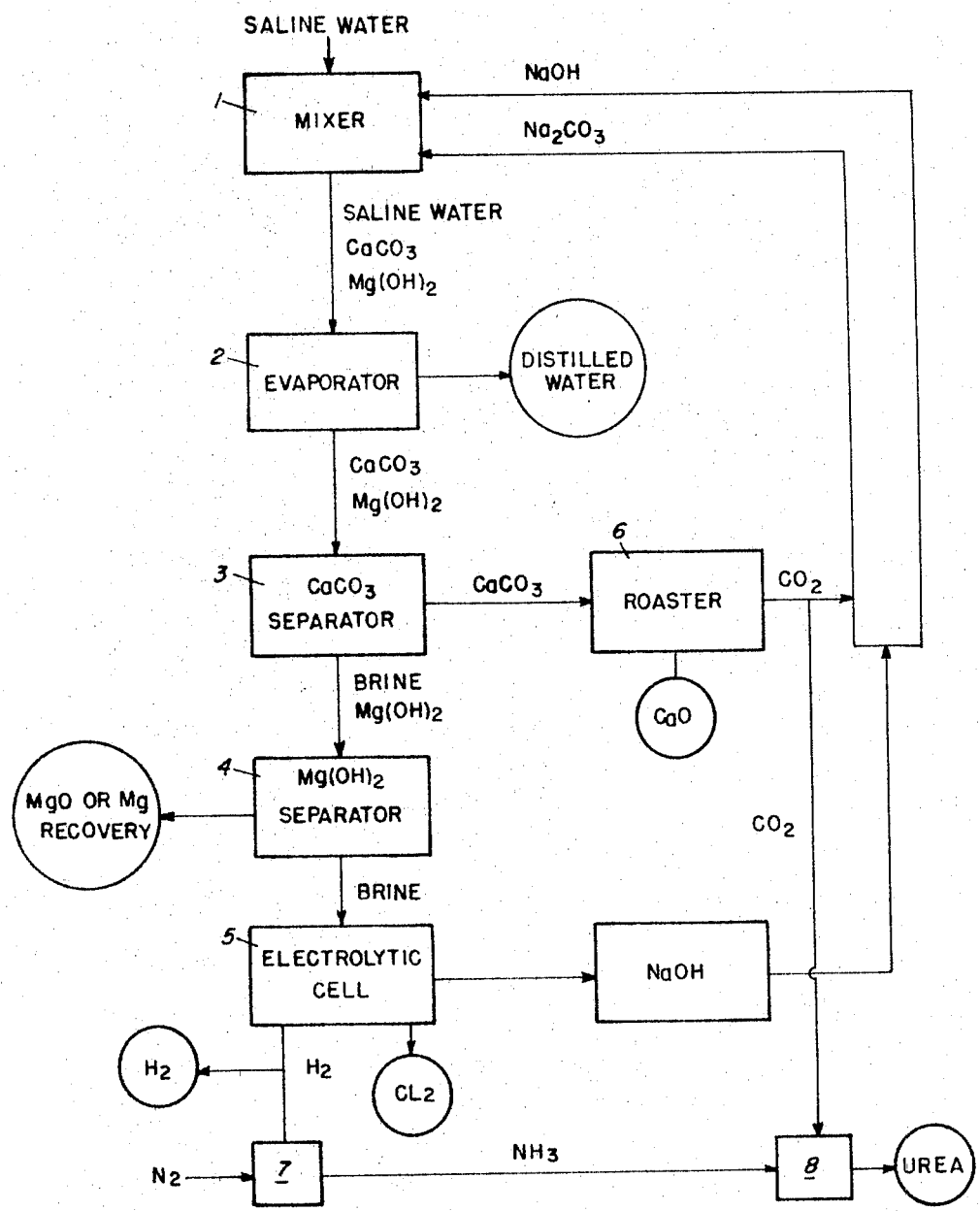

Referring now to FIG. 1, there is shown a flow diagram of a preferred process in which scale formers are precipitated from saline water and the resulting mixture is passed through an evaporator.

Input saline water containing calcium and magnesium scale formers is contacted in a mixer 1 with an amount of sodium hydroxide and sodium carbonate sufficient to precipitate out substantially all the calcium and magnesium ions according to the following reactions:

(1)     $Ca^{++}+Na_2CO_3 \rightarrow Ca(CO_3)\downarrow+2Na^+$ (2)     $Mg^{++}+2NaOH \rightarrow Mg(OH)_2\downarrow+2Na^+$ The precipitation results in a slurry containing saline water, calcium carbonate and magnesium hydroxide. After precipitation, the entire slurry may be passed safely through the evaporator portion 2 of a distillation apparatus without fear of further precipitation of calcium or magnesium. In evaporative still 2, water is evaporated from the saline solution to form distilled water. Leaving the evaporative still 2 is a mixture of concentrated brine, calcium carbonate and magnesium hydroxide which then enters a separator 3 where the dense calcium carbonate is separated from the concentrated brine and the less dense magnesium hydroxide. The remaining mixture of brine and magnesium hydroxide is then passed to a second separator 4 where a precipitated magnesium hydroxide is removed. This separated hydroxide may be further treated by well known processes to recover either magnesia or magnesium metal using electricity and/or heat from an associated power system. A minor portion of the saline brine is further passed to an electrolytic cell 5 in which chlorine is the product on the anode side and caustic and hydrogen are the products on the cathode side. If the throughput in the cell is small it is preferred that a conventional diaphragm type cell be employed, whereas if the throughput is large it may be desirable to use a mercury cell such as disclosed in Chemical and Engineering News, Sept. 19, 1966, page 68. The hydrogen and chlorine are recovered as valuable by-products while the sodium hydroxide is recycled. A portion of the caustic recycle goes directly to the mixer to precipitate magnesium hydroxide. A second portion is contacted with a stoichiometric proportion of carbon dioxide converting it to sodium carbonate which is passed to the mixer to precipitate calcium content of the saline water as calcium carbonate. Carbon dioxide for this reaction and by-product calcium oxide are obtained by calcining in roaster 6 the calcium carbonate recovered in the second separator. The amount of carbon dioxide recovered by calcining is greater than that necessary to produce the required amount of sodium carbonate, allowing a portion of the carbon dioxide to be sold, as is, or to be used in the formation of urea. This formation is accomplished by first combining at 7 the hydrogen from the electrolytic cell with nitrogen obtained by separation from liquefied air by conventional means to form ammonia by synthesis. The synthesis may be accomplished through a number of known processes including the Fauser and Mont Unis processes. Next, the ammonia and carbon dioxide are combined at 8 to form urea by any one of a number of conventional processes including that described in U.S. Patents 1,898,093 and 2,116,881, those described by Skein, J. R., in Chem. Eng., 56, No. 6319 (1949), or by the Inventa Process.

Advantages for this embodiment include the ease of separating the precipitates from the concentrated brine rather than the larger volume of virgin saline solution and the large quantity of chlorine, ammonia, hydrogen, lime, carbon dioxide, magnesium and urea which can be manufactured with this flow scheme. Also, the use of hydrochloric or other acids to readjust (lower) the pH prior to evaporator 2 is not required. Evaporation at higher pH values, as compared to present practice at pH 7 or lower, decreases corrosion problems and makes cheaper materials of construction possible for the evaporator.

Figure 2:
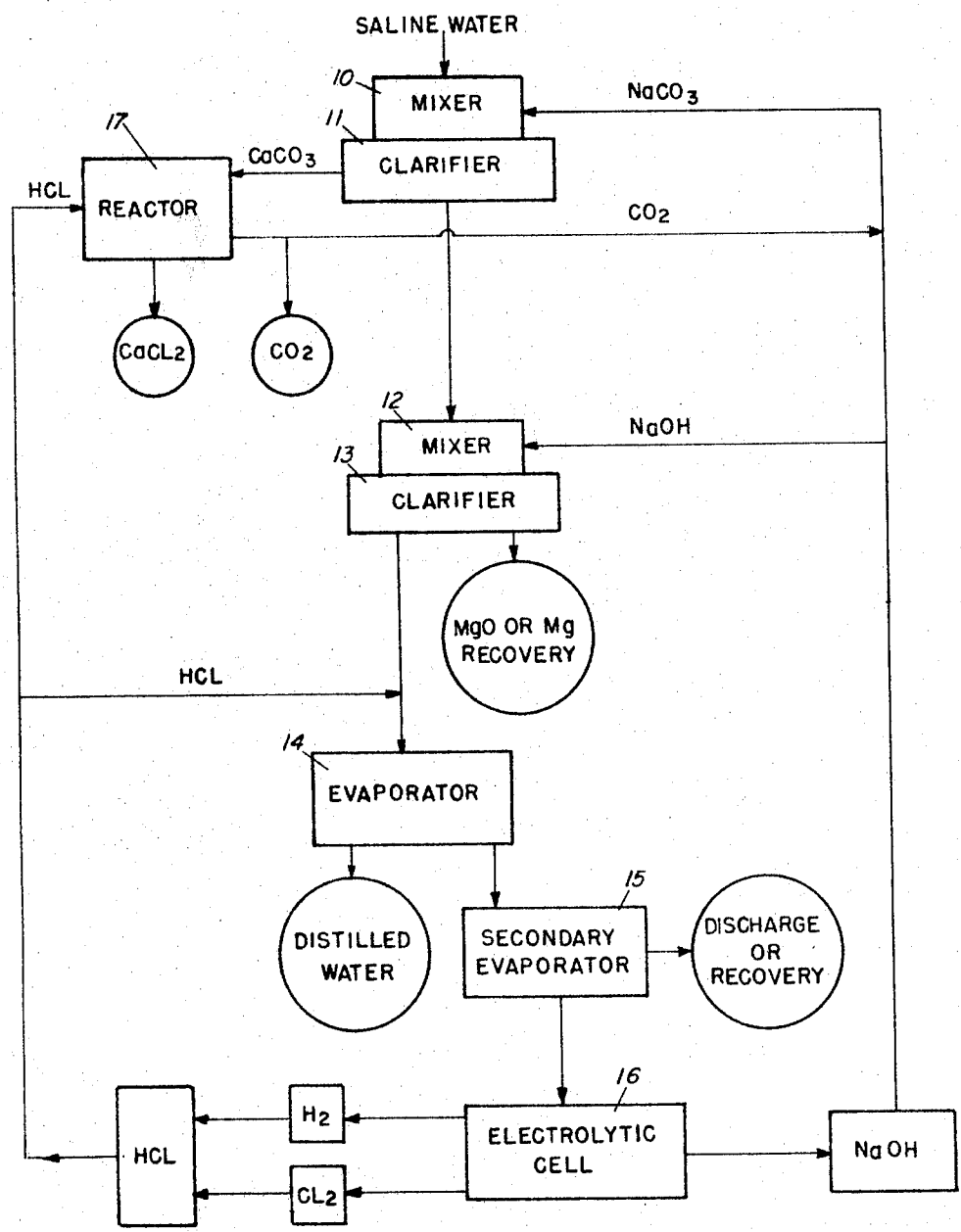

FIG. 2 shows an alternative process. In that figure saline water containing scale formers is fed to a first mixer 10 where it is contacted with sodium carbonate and caustic causing the calcium content of the saline water to precipitate out as calcium carbonate according to reaction (1) above. In this embodiment the pH within the first mixer should be kept around a value of 9.2. The mixture of saline water and carbonate precipitate is passed to a clarifier 11 where the precipitate is collected and removed from the saline water. The decalcified saline stream is then fed to a second mixer 12 where it is contacted at a pH of about 9.6 or higher with sodium hydroxide to induce the precipitation of magnesium as magnesium hydroxide according to reaction (2) above. The mixture of saline water and hydroxide precipitate is passed to a second clarifier 13 where the solids are removed and sent to a magnesia or magnesium metal recovery. The saline water is then fed to an evaporator unit 14 in which a small amount of acid is added prior to introduction to the evaporator for the purpose of preventing the formation of any residual scale formation. The evaporation results in a distilled water product and in a concentrated brine.

The brine is sent to a secondary evaporator 15 where sulfate-free sodium chloride is crystallized and separated. The remaining portion of the brine is discarded or sent to a mineral recovery process for the removal of potassium, lithium, bromine, or iodine. The sodium chloride dissolved in water provides the input to an electrolytic cell 16. The cell as in FIG. 1 produces chlorine at the anode and sodium hydroxide and hydrogen at the cathode. The hydrogen and chlorine are combined to form hydrogen chloride, a portion of which is recycled to a reactor 17 and therein contacted with the calcium carbonate separated by the first clarifier 11. The reaction produces a calcium chloride by-product and a stream of carbon dioxide gas. second portion of recycle hydrogen chloride serves as the acid addition to the saline water feed to the evaporator. The sodium hydroxide produced in the electrolytic cell is also divided into two recycle streams. One stream is contacted with the carbon dioxide stream produced by the reaction between hydrogen chloride and calcium carbonate, the result being a conversion of the hydroxide to sodium carbonate which is fed to the first mixer 10. The second portion of recycle sodium hydroxide is fed directly to the second mixer 11 to precipitate magnesium hydroxide.

It can be seen that the main difference between this embodiment and the one shown in FIG. 1 is the removal of calcium and magnesium precipitate before the evaporator stage. This method will be chosen where the pumping of slurry through distillation equipment is not practical.

A second difference is the elimination of sulfate prior to electrolysis. This step should be used in flowsheet variations where the sulfate concentration is high enough to cause excessive electrode consumption or other operating problems.

Figure 3:
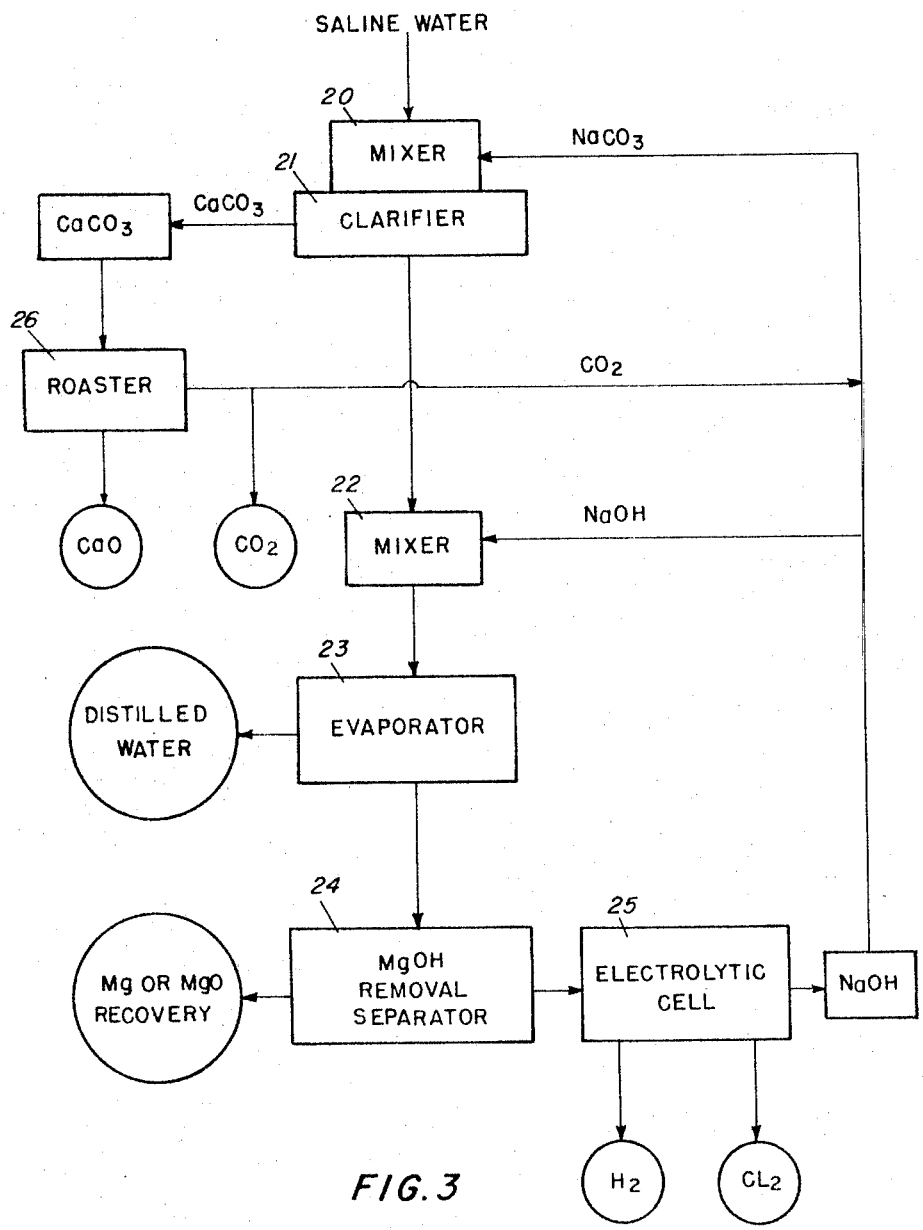

A third embodiment is shown in FIG. 3. There, saline water, containing scale formers are fed to a first mixer 20 where they are contacted with a stream of sodium carbonate and caustic at a pH of about 9.2. The resulting saline water-calcium carbonate slurry is passed to a clarifier 21 where the carbonate precipitate is removed. The decalcified saline water then enters a second mixer 22 where it is contacted with caustic causing the magnesium contained in the saline water to precipitate out as magnesium hydroxide. The resulting slurry is then passed through an evaporative still 23 where distilled product water and a concentrated brine containing the magnesium hydroxide are formed. The brine-precipitate mixture is passed to a separator 24 where the magnesium hydroxide precipitate is removed and if desired, further treated to recover magnesia or magnesium metal. The residual saline water is passed on to an electrolytic cell 25 where hydrogen and chlorine are produced as by-products and sodium hydroxide is formed for recycle. A portion of the sodium hydroxide is contacted with a stream of carbon dioxide formed by calcining in a roaster 26, the calcium carbonate which has been separated and recovered in clarifier 21. The result is that the sodium hydroxide is converted to sodium carbonate for addition to the first mixer 20. The remainder of the hydroxide recycle is passed directly to the second mixer 22 to induce precipitation of magnesium hydroxide.

Figure 4:
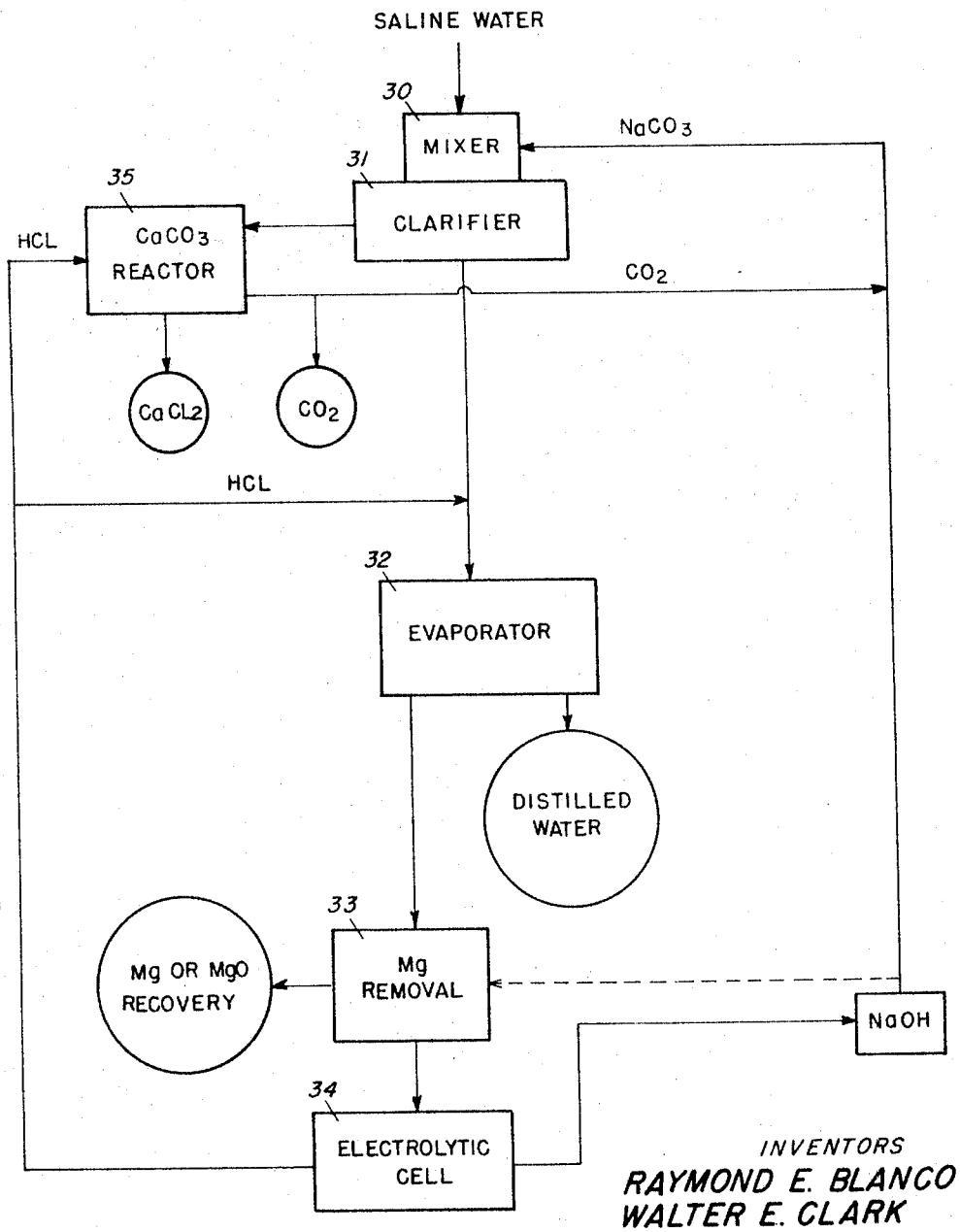

A fourth embodiment is shown in FIG. 4. In that figure saline water containing calcium and magnesium scale formers is contacted with caustic and sodium carbonate in a mixer 30 to precipitate the calcium content of the saline water as calcium carbonate. This precipitate is then collected and removed in a clarifier 31 while the decalcified saline water is, after an acid addition, fed to an evaporator 32. The distilled water from the evaporator is recovered as a product and the concentrated brine is sent to a secondary evaporator 33 and crystallizer where magnesium hydroxide is removed by caustic addition to a pH of about 9.6 or higher. The magnesium hydroxide may if desired be sent to a further recovery of magnesia or magnesium metal, whereas the brine is passed to an electrolytic cell 34. This electrolytic cell has an anode that produces oxygen is preference to chlorine and thus hydrogen chloride and caustic form the electrolysis products. A portion of the hydrogen chloride is recycled to a reactor 35 and contacted with the calcium carbonate which was separated in clarifier 31. The result is a production of a calcium chloride by-product and carbon dioxide. A second portion of the hydrogen chloride is recycled to provide the acid addition to the saline water evaporator 32 input. This acid addition is important in this instance to prevent the formation of magnesium hydroxide scale in the evaporator.

The recycle sodium hydroxide is reacted with the carbon dioxide gas resulting from the addition of hydrogen chloride to the separated calcium carbonate and the resulting sodium carbonate-caustic solution is fed to the first mixer 30 to precipitate calcium carbonate. Optionally, a portion of sodium hydroxide may be contacted in the separator 33 with the evaporator blowdown to aid in the precipitation of magnesium hydroxide.

It is evident that the above preferred embodiments may be altered without departing from the invention. For example, carbon dioxide may be generated either by adding acid to, or calcining, calcium carbonate in any flow pattern. Also, the type of electrolytic cell and the composition of feed to that cell my be altered to produce either hydrogen and chlorine or hydrogen chloride. Further, urea may be formed any time hydrogen is produced in an electrolytic cell.

The important considerations are that the process operate to prevent scaling and that it be internally self-sufficient with respect to chemical feed. All of the above described processes have these advantages. These features are particularly important where the size of the desalination unit is large and/or where the evaporative desalination is joined with a cheap source of electric power, such as, in a nuclear electric generating and desalination plant.

What is claimed is:
1. A method of treating saline water containing scale formers including calcium, magnesium and carbonate ions comprising, contacting said saline water with sodium hydroxide and sodium carbonate to precipitate said ions as calcium carbonate and magnesium hydroxide thereby forming an alkaline slurry of saline water and said precipitates, passing said alkaline slurry through a distillation unit to produce potable water and a concentrated slurry, removing said calcium carbonate from said slurry, removing magnesium hydroxide from said slurry thereby leaving a concentrated brine, passing said concentrated brine to an electrolytic cell wherein hydrogen, chlorine and sodium hydroxide are formed, roasting said removed calcium carbonate to form calcium oxide and carbon dioxide, reacting a portion of said sodium hydroxide with a portion of said carbon dioxide to form sodium carbonate, passing said sodium carbonate to said mixer, passing a portion of said sodium hydroxide formed in said electrolytic cell to said mixer, reacting said hydrogen produced in said electrolytic cell with nitrogen to produce ammonia, and reacting said ammonia with a portion of said carbon dioxide to form urea.

References Cited

UNITED STATES PATENTS

| | | | |
|---|---|---|---|
| 3,119,752 | 1/1964 | Checkovich | 203—11 |
| 3,147,072 | 9/1964 | Thomsen | 23—201 X |
| 3,218,241 | 11/1965 | Checkovich | 203—7 |
| 3,248,181 | 4/1966 | Akimoto | 203—7 X |
| 3,262,865 | 7/1966 | Waters | 203—7 |
| 3,350,292 | 10/1967 | Weinberger et al. | 203—7 X |
| 3,220,941 | 11/1965 | Osborne | 204—98 X |

FOREIGN PATENTS 951,643  3/1964  Great Britain.

OTHER REFERENCES

Saline Water Conversion (Symposium) (1958), pages 45–50 incl. 202-S. WC Digest.

NORMAN YUDKOFF, Primary Examiner

F. E. DRUMMOND, Assistant Examiner

U.S. Cl. X.R.

23—184, 198, 201; 203—7; 204—87, 96